(12) United States Patent
Horn et al.

(10) Patent No.: US 7,331,099 B2
(45) Date of Patent: Feb. 19, 2008

(54) MACHINE TOOL AND METHOD FOR THE CORRECTION OR COMPENSATION OF DIFFERENT TOOL LENGTHS IN A MACHINE TOOL

(75) Inventors: Wolfgang Horn, Goeppingen (DE); Harald Boehler, Echterdingen (DE); Walter Pompe, Gingen (DE); Friedrich Winckler, Schwaebisch Gmuend (DE)

(73) Assignee: Ex-Cell-O GmbH, Eislingen/Fils (DE)

( * ) Notice: Subject to any disclaimer, the term of this patent is extended or adjusted under 35 U.S.C. 154(b) by 0 days.

(21) Appl. No.: 11/464,059

(22) Filed: Aug. 11, 2006

(65) Prior Publication Data

US 2007/0053756 A1    Mar. 8, 2007

Related U.S. Application Data

(63) Continuation of application No. PCT/EP2005/000579, filed on Jan. 21, 2005.

(51) Int. Cl.
*B23Q 1/60* (2006.01)
*B23Q 17/22* (2006.01)
*B23Q 11/00* (2006.01)
*B23Q 39/04* (2006.01)

(52) U.S. Cl. .......................... 29/563; 29/27 C; 82/132; 82/137; 82/138

(58) Field of Classification Search .................. 29/563, 29/56.5, 26 A, 27 C, 27 R, 40; 74/490.07; 409/235, 131, 189, 190, 191, 192, 231, 232, 409/230, 241; 408/234; 82/132, 137, 138, 82/154, 157
See application file for complete search history.

(56) References Cited

U.S. PATENT DOCUMENTS

| | | | |
|---|---|---|---|
| 3,347,116 A * | 10/1967 | Anderson et al. ............. 408/13 |
| 4,159,660 A | 7/1979 | Buckley et al. | |
| 4,197,769 A * | 4/1980 | Smith et al. .................. 82/129 |
| 4,763,549 A * | 8/1988 | Hata et al. ..................... 82/124 |
| 4,813,311 A * | 3/1989 | Hebbruggen ................. 82/117 |
| 5,005,452 A * | 4/1991 | Wood, III ..................... 82/132 |
| 5,105,694 A * | 4/1992 | Smith et al. .................. 82/138 |
| 5,284,076 A * | 2/1994 | Fritz et al. .................... 82/118 |
| 5,699,598 A | 12/1997 | Hessbrüggen et al. | |
| 5,839,323 A | 11/1998 | Line | |
| 5,943,928 A * | 8/1999 | Oh ............................... 82/137 |
| 6,551,038 B1 * | 4/2003 | Sugata et al. ............... 409/235 |
| 6,666,632 B1 * | 12/2003 | Fioroni ....................... 409/235 |
| 7,018,147 B2 * | 3/2006 | Hiramoto et al. .......... 409/235 |
| 7,093,334 B2 * | 8/2006 | Sobrito ....................... 29/26 A |
| 2006/0213322 A1 | 9/2006 | Bauer et al. | |

FOREIGN PATENT DOCUMENTS

| | | |
|---|---|---|
| DE | 196 52 460 C1 | 2/1998 |
| DE | 100 23 916 A 1 | 11/2001 |
| EP | 0 412 635 A2 | 2/1991 |
| WO | WO 2005/000507 A1 | 1/2005 |

\* cited by examiner

*Primary Examiner*—Dana Ross
(74) *Attorney, Agent, or Firm*—Alston & Bird LLP

(57) ABSTRACT

In order to provide a machine tool with at least one movable slide, which has a plurality of holders for tools and/or workpieces, and which can be corrected in a simple manner, the at least one slide has a plurality of separate subslides and the relative position of the subslides in relation to one another is adjustable in a securable manner.

25 Claims, 6 Drawing Sheets

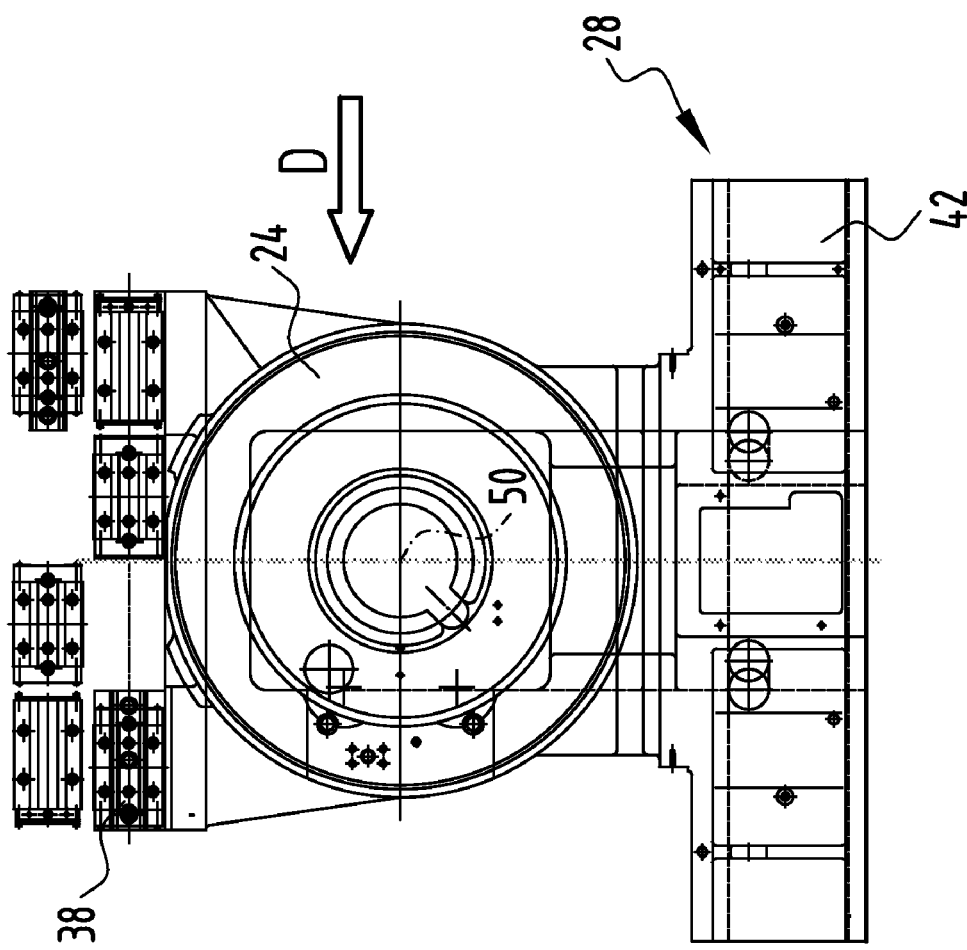
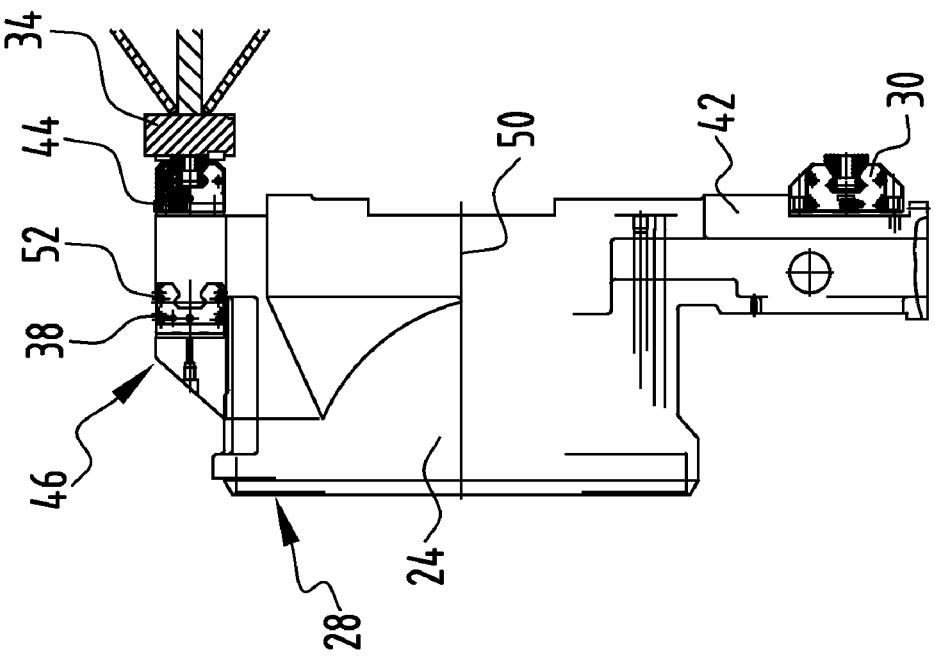

MACHINE TOOL AND METHOD FOR THE CORRECTION OR COMPENSATION OF DIFFERENT TOOL LENGTHS IN A MACHINE TOOL

CROSS REFERENCE TO RELATED APPLICATIONS

This application is a continuation of international application PCT/EP2005/000579, filed on Jan. 21, 2005, and also claims the benefit of German Application No. 10 2004 008 457.2, filed Feb. 13, 2004, both of which are incorporated herein by reference in their entirety and for all purposes.

BACKGROUND OF THE INVENTION

The invention relates to a machine tool with at least one movable slide which has a plurality of holders for tools and/or workpieces. The invention relates, in addition, to a method for the correction or compensation of different tool lengths in a machine tool.

In the case of a multiple spindle machine tool, a plurality of workpieces (according to the number of tool spindles) may be machined at the same time. Therefore, shorter machining times result in relation to the number of workpieces.

SUMMARY OF THE INVENTION

In accordance with the invention, a machine tool is provided with which different tool lengths can be corrected in a simple manner. In accordance with the invention, at least one slide has a plurality of separate subslides and the relative position of the subslides in relation to one another can be adjusted in a securable manner. In the case of the machine tool in accordance with the invention, the movement of the at least one slide is brought about during procedural processes as a compound slide or subslide assembly. Only one single axis for such a slide need be addressed in the numerical control (NC) program when this slide is movable linearly. The slide with the plurality of workpieces or with the plurality of tools may therefore be controlled as a whole in its movability. If separate slides were to be provided, their movement would have to be controlled separately. As a result, a plurality of workpieces may be machined synchronously. The programming resources or adaptation resources are kept small due to the "locked" NC axis.

Since the slide is separated into subslides, the relative position of which in relation to one another can be adjusted in a securable manner, a compensation with respect to differences in relative positions between the two subslides and, in particular, with respect to workpieces and/or tools can be brought about. In particular, a correction of the entire device (i.e., an adjustment) can be carried out. In addition, the assembly of the machine tool may be simplified since an alignment, for example, between tool spindles and workpiece supports, is possible via the adjustability of the subslides. A correction of tool lengths can also be carried out when the relative position of the subslides is adjusted in accordance with the differences in tool lengths.

At least one holder is arranged, in particular, on each subslide. As a result, the relative position of holders in the machine tool may be adjusted. If the holders are, for example, tool spindles, the relative position of tool spindles may be adjusted. As a result, an assembly of the machine tool is, on the one hand, simplified since an alignment may be carried out in a simple manner. Corrections of tool lengths may also be carried out or adjustment procedures carried out.

It is particularly advantageous when the movement of the at least one slide is brought about during the workpiece machining as a subslide assembly. No separate drive control for the subslides need then be provided but rather only the combination of the subslides (the subslide assembly) with a rigidly fixed position of the subslides relative to one another is moved in a controlled manner. Favorably, exactly one holder is arranged per subslide so that a correction or compensation may be carried out separately for each holder.

The relative position of subslides may be adjusted in a simple manner when the relative position of adjacent subslides can be adjusted. One subslide must then have corresponding connecting elements via which it can be fixed to an adjacent subslide. Such connecting elements may be formed, for example, in a simple manner as a type of bracket. Affixing each subslide in position may be achieved in a simple manner, for example, via clamping and/or form-locking connections.

An adjustability of the relative position can be achieved in a simple manner when an adjustability in one direction essentially parallel to the direction of movement of the slide is provided. Provision need then be made only for movability in one direction. The guidance of the slide on guide paths is not interfered with, or hindered by, the adjustability since the adjustability is configured in the direction of guidance. The at least one slide is favorably guided on guide paths. Spaced, outer guide paths are preferably provided in order to support and to guide the at least one slide. When at least one additional guide path is provided in order to support the at least one slide at, or in the vicinity of, a connecting area of two subslides, the stability of the slide may be ensured as a result, despite separation into subslides.

Favorably, adjacent subslides can be fixed to one another via a securing device, such as, for example, a clamping device. As a result, an adjustability of the relative position may be realized in a simple manner. A continuous adjustability is, in particular, made possible. Since the lifting height for the adjustment of the relative position can be very small (for example, smaller than 1 mm), a small, relative positional displacement can also be fixed.

Particularly in the case of adjacent subslides, a first subslide has connecting elements and a second subslide adapted connecting elements which can be fixed to one another. As a result, a subslide assembly may be provided in a simple manner, wherein the subslide assembly is moved in a controlled manner as a whole.

A drive for the at least one slide is provided, in particular. In accordance with the invention, no separate drives for the subslides need be provided.

In one embodiment, the at least one slide supports a plurality of tool spindles. It may also be provided for the at least one slide to support a plurality of workpiece supports (workpiece tables).

In one embodiment of the machine tool according to the invention, a plurality of slides is provided, wherein the slides are movable in different directions. As a result, an optimum correction of the machine tool may be carried out since an adjustability in several directions is made possible. In addition, a simplified assembly may be achieved since an alignment in several directions is possible.

For example, a first slide is provided which is movable in a first direction (Z direction). This first slide supports, for example, a plurality of workpieces via workpiece supports (workpiece tables). A correction of tool lengths may be carried out, for example, via such a slide in that the relative position of the subslides in the first direction is adjusted. Two spaced motors and, in particular, two spaced linear motors (i.e., a pair of linear motors) are provided for driving the first slide.

A second slide may be provided which is movable in a second direction (X direction). As a result, an adjustability is also made possible, in particular, for the assembly and the correction in the X direction. Two pairs of motors and, in particular, two pairs of linear motors are provided for driving the second slide. The pair of linear motors are preferably arranged symmetrically.

A third slide may be provided which is movable in a third direction (Y direction). A compensation may also be carried out in the Y direction as a result of such a third slide. For example, the drive for the third slide comprises two spaced motors and, in particular, a pair of linear motors.

It may be provided for a first slide to support a second slide and for the second slide to support a third slide. The first slide can be displaced, for example, in relation to a machine frame. The second slide is then displaceable on the first slide and the third slide is displaceable on the second slide. The third slide supports, for example, one or several tool spindles. A movability in a Z direction of the tool spindles may then be realized, for example, via the third slide. A movability in a Y direction may be realized via the second slide and a movability in an X direction may be realized via the first slide.

At least one tool and/or workpiece is movable in all three spatial directions, in particular, by means of a slide compound consisting of the first slide, the second slide and the third slide. It is particularly advantageous when the slides are disconnected in all the linear axes of movement of the machine tool. An adjustment or a correction in all the axes of movement may also then be carried out.

In accordance with the invention, a method is provided for the correction or compensation of different tool lengths in a machine tool which can be carried out in a simple manner. In accordance with the invention, on a movable slide, which supports a plurality of tools and/or of workpieces and is formed by means of subslides which can be fixed to one another, the relative position of the subslides is adjusted in accordance with the length of the tool supported on, or associated with, a respective subslide. The method in accordance with the invention has the advantages already explained in conjunction with the machine tool in accordance with the invention. Additional, advantageous embodiments of the method in accordance with the invention have already been explained in conjunction with the machine tool in accordance with the invention.

The relative position of the subslides in the direction of movement of the slide is, in particular, adjusted. As a result, the guidance of the slide on its guide is not hindered by the adjustability. The subslides support, in particular, different tools and/or workpieces to be machined by different tools. An individual correction or compensation can then be carried out. The movement of the slide during the machining of workpieces is favorably controlled as a subslide assembly, i.e., controlled as a whole. Only a single synchronized NC axis need then be provided for the slide in the case of a linear movability.

The following description of a preferred embodiment serves to explain the invention in greater detail in conjunction with the drawings.

BRIEF DESCRIPTION OF THE DRAWINGS

In order to assist the understanding of embodiments of the invention, reference will now be made to the appended drawings, which are not necessarily drawn to scale, and wherein:

FIG. 4(*b*) shows a side view of the area G1 in the direction C according to FIG. 4(*a*);

FIG. 5(*a*) shows an enlarged illustration of the area G2 according to FIG. 3;

FIG. 5(*b*) shows a side view of the area G2 in the direction D according to FIG. 5(*a*)

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural referents unless the context clearly dictates otherwise.

Figure 1:
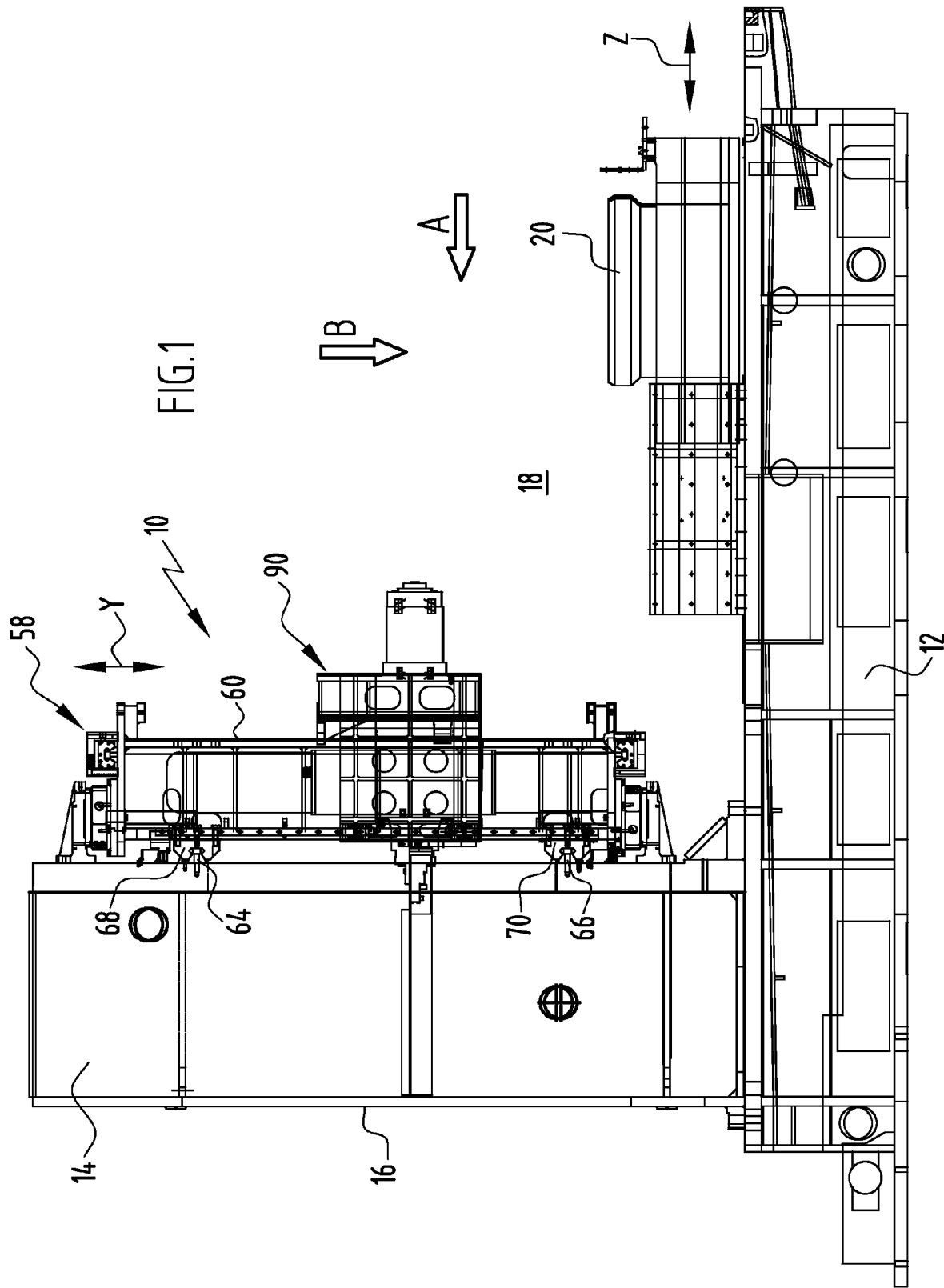
FIG. 1 shows a schematic (partial) side view of one embodiment of a machine tool according to the invention.
Figure 2:
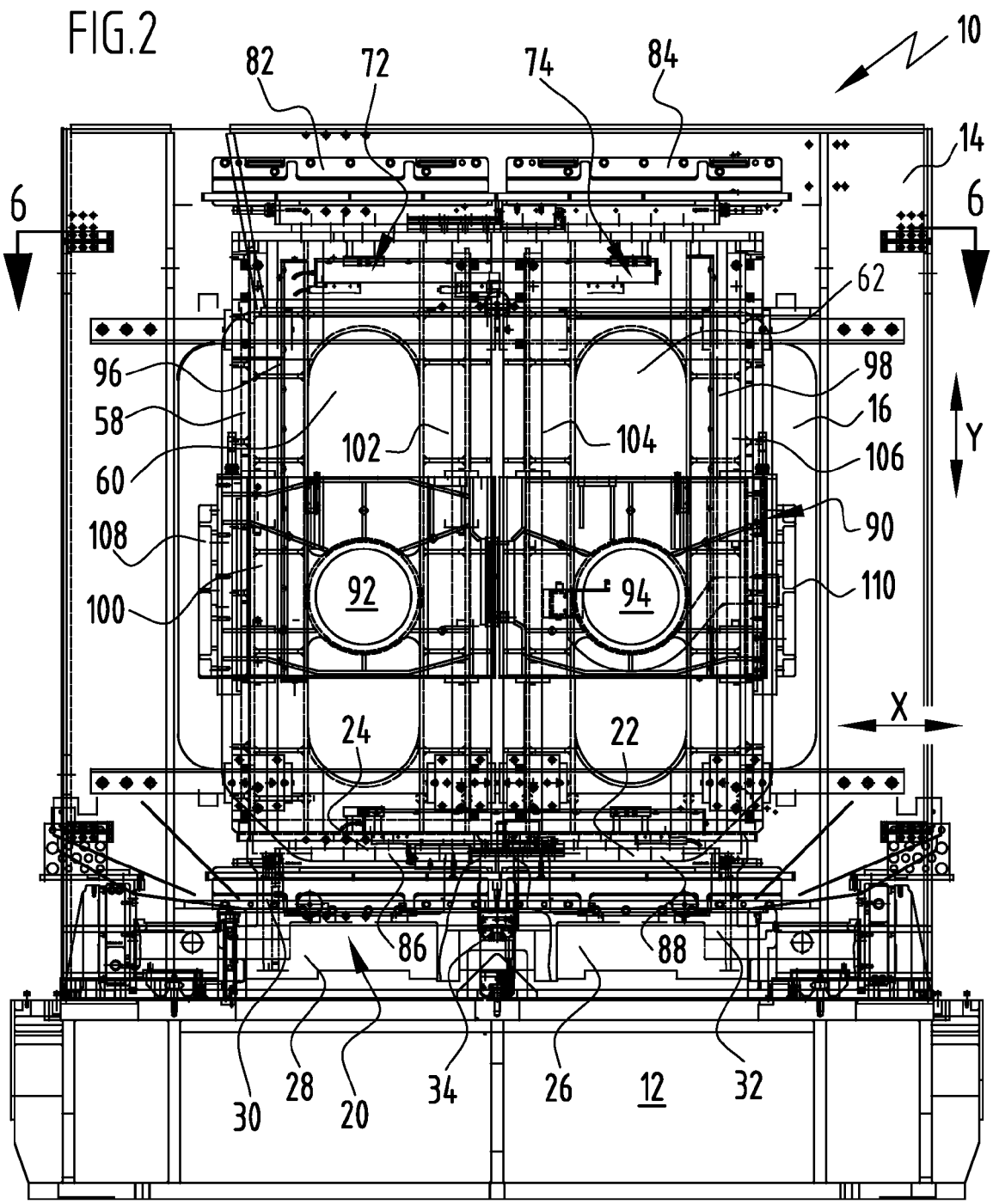
FIG. 2 shows a front view of the machine tool according to FIG. 1 in the direction A.
Figure 3:
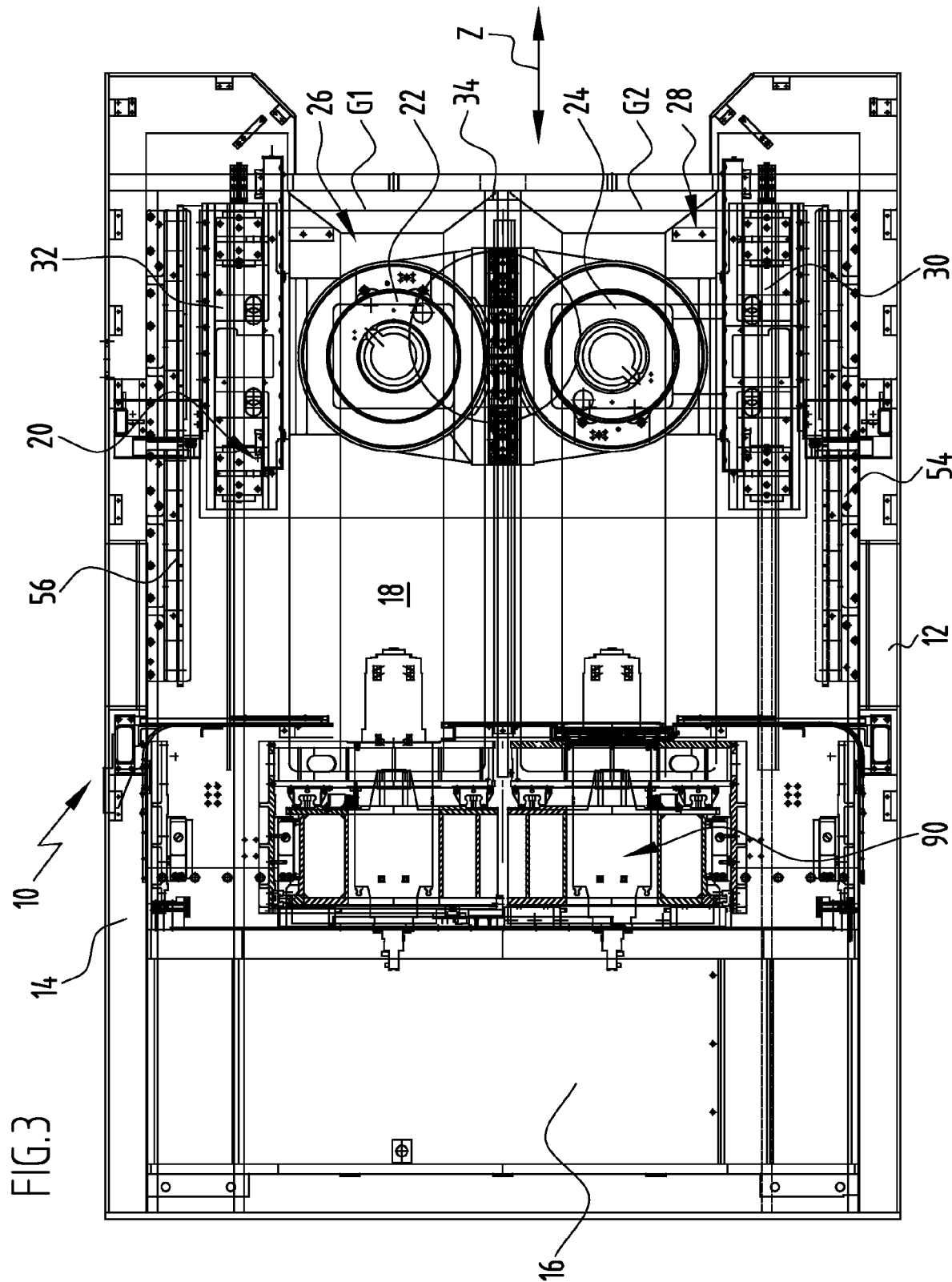
FIG. 3 shows a plan view of the machine tool according to FIG. 1 in the direction B.

One embodiment of a machine tool in accordance with the invention, which is shown in FIGS. 1 to 3 and designated as a whole as 10, comprises a machine base 12, by means of which the machine tool 10 is placed on a support. A machine frame 14 rises above the machine base 12 and this is designed, for example, in the shape of a gateway or yoke with a central opening 16. Supply lines for tool spindles are guided, for example, via this central opening 16. Control devices and switch cabinets, from which energy supply lines proceed, adjoin the machine frame 14 on a side facing away from a working area 18 (not shown in the drawings).

A first slide 20 (Z slide) is guided on the machine base 12 for linear displacement in a first direction (Z direction). The direction of displacement Z is, in particular, essentially a horizontal direction. The first slide 20 has a plurality of workpiece supports, for example, in the form of workpiece tables. In the case of the embodiment shown in the Figures, the first slide 20 has a first workpiece support 22 and a second workpiece support 24. In this embodiment, the machine tool 10 is designed as a twin spindle machine tool.

Respective workpieces may be clamped into the workpiece supports 22, 24, wherein two workpieces can then be machined at the same time. In principle, it is possible for the first slide to also have more than two workpiece supports. It may be provided for the workpiece supports 22, 24 to be rotatable about an axis transversely to the Z direction. The axis of rotation is preferably a vertical axis.

The first slide 20 is formed by means of a first subslide 26 and a second subslide 28. Thus, the first slide 20 is a compound slide or subslide assembly. The movement of the first slide 20 is controlled as a whole, i.e., the movement of the subslide assembly is controlled and not the movement of the individual subslides 26, 28.

Figure 4B:
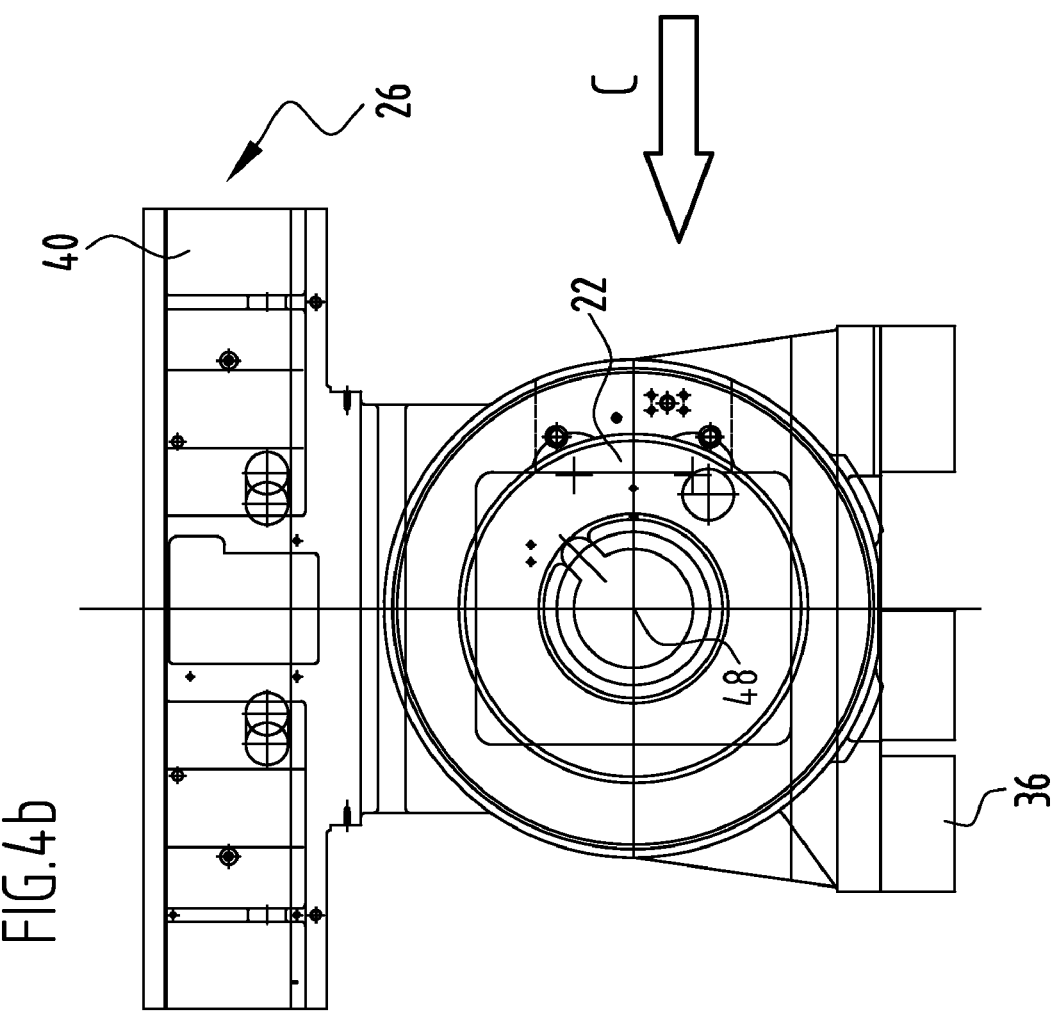
FIG. 4(*a*) shows an enlarged illustration of the area G1 according to FIG. 3.
Figure 4A:
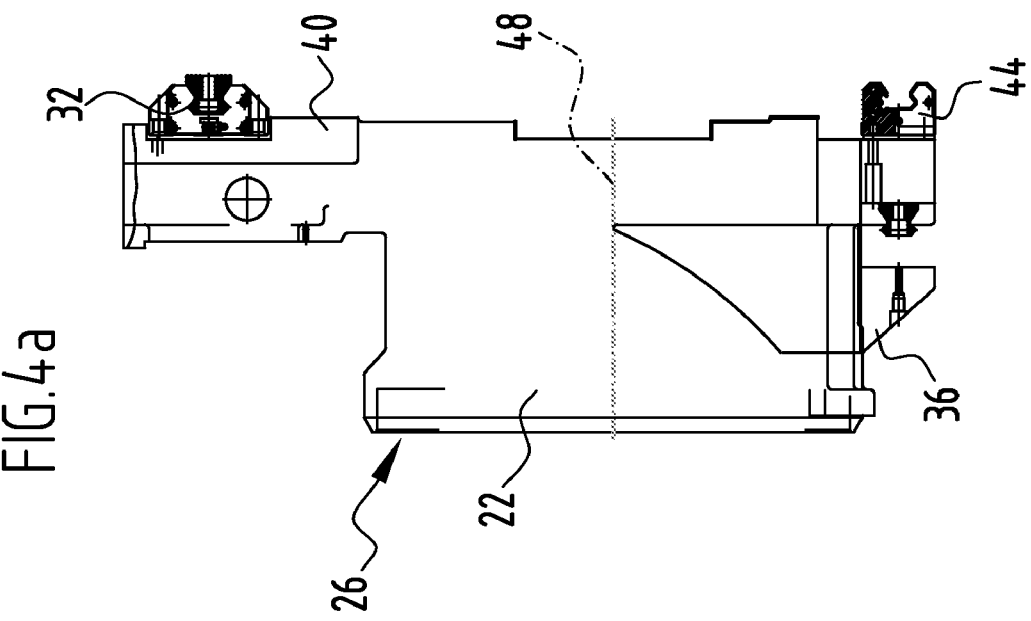

The first workpiece support 22 is arranged on the first subslide 26 and the second workpiece support 24 is arranged on the second subslide 28. The relative position of the two subslides 26 and 28 in relation to one another is adjustable in the direction Z. As a result, the relative position of the two workpiece supports 22, 24 is also adjustable in the direction Z. The relative position of the two subslides 26 and 28 in relation to one another can, on the other hand, be secured. For this purpose, the first slide is divided into the two subslides 26, 28 (FIGS. 4 and 5).

A first outer guide path 30 and a second outer guide path 32 for the first slide 20 are arranged on the machine base 12. These guide paths 30, 32, which are formed, in particular, via guide rails, extend in the Z direction. In the area of its lateral end, the first slide 20 has corresponding guide shoes 40, 42, with which the first slide 20 is seated on the guide paths 30, 32 and via which the slide 20 is guided on the guide paths 30, 32.

An additional guide path 34 is provided which is arranged between the two outer guide paths 30, 32 and is, in particular, arranged centrally. This is, again, preferably formed via a guide rail and extends in the Z direction. The first slide 20 is separated in the vicinity of this third guide path 34, i.e., one end of the first subslide 26 and an adjacent end of the subslide 28 are located in the area of this guide path 34. As a result, the first slide 20 may be supported in a connecting area of the two subslides 26, 28 via the guide path 34.

The first subslide 26 has connecting elements 36 which face the second subslide 28 and are formed, for example, by means of brackets. The second subslide 28 has connecting elements 38 adapted to the first subslide 26, wherein the connecting elements 36 and 38 are adapted to one another. The connecting elements 36 and 38 may be connected to one another, in particular, in a clamped manner in order to connect the two subslides 26, 28 to form a subslide assembly 20.

For example, the first subslide 26 has one or several linearly aligned guide shoes 40 for the guide path 32. The first subslide 26 has, in addition, one or several linearly aligned guide shoes 44 for placement on the third guide path 34. The connecting elements 36 of the first subslide 26 are preferably arranged above the guide shoe or shoes 44 in a vertical direction transverse to the Z direction. The connecting elements 38 of the second subslide 26 are seated at a different level in relation to the guide path 34 so that a connection is made possible, with which associated connecting elements 36, 38 are located one above the other and, in this respect, are located above the guide shoe or shoes 44 (cf. FIG. 5(b)). The connection may be brought about via a securing device, for example, via a clamping device 46, with which associated connecting elements 36, 38 are clamped to one another.

When the subslides 26, 28 are not fixed in position, their relative position can be adjusted in the Z direction. The subslides may be shifted relative to one another in the Z direction. As a result, the relative distance between a central axis 48 of the workpiece support 22 and a corresponding, central axis 50 of the second workpiece support 24 can be adjusted in the Z direction.

A typical order of magnitude for the adjustability is in the millimeter range. For example, with a path of displacement of the first slide 20 in a length range of 800 mm, a relative adjustability of the position of the two subslides 26 and 28 in the Z direction is realized in the order of magnitude of ±2.5 mm.

In order to make the adjustability easier, it may be provided for the two subslides 26, 28 to be provided with a guide 52 which sees to it that only a Z movement is allowed in the case of a relative adjustment of the position of the two subslides 26, 28 in the Z direction. The Z direction forms a single NC axis. The slide 20 is driven as a subslide assembly with subslides 26, 28 fixed relative to one another by two spaced motors 54, 56. The motors 54, 56 are located in the area of the guide paths 30, 32 so as to be aligned symmetrically. The motors 54, 56 are, in particular, a pair of linear motors arranged symmetrically.

The machine frame 14 forms a slide carrier for a second slide 58 (X slide). This is guided for displacement in a second direction X, wherein the direction X is at right angles to the Z direction and is preferably a horizontal direction. The second slide 58 is of a yoke-shaped design with a first central opening 60 and a second central opening 62. It supports a third slide (Y slide) which is described in greater detail hereinbelow and which, again, has tool holders. The second slide 58 therefore has tool holders via the third slide.

A first guide path 64 and a spaced, second guide path 66 are arranged on the machine frame 14. These are designed, for example, in the form of guide rails. The second slide 58 has corresponding guide shoes 68, 70, via which it is guided on the guide paths 64, 66. The guide paths 64, 66 are spaced, in particular, vertically.

The second slide 58 (X slide) comprises a first subslide 72 and a second subslide 74. The central opening 60 is formed in the first subslide 72 and the second central opening 62 in the second subslide 74. The two subslides 72, 74 are each of a yoke-shaped design.

Figure 6:
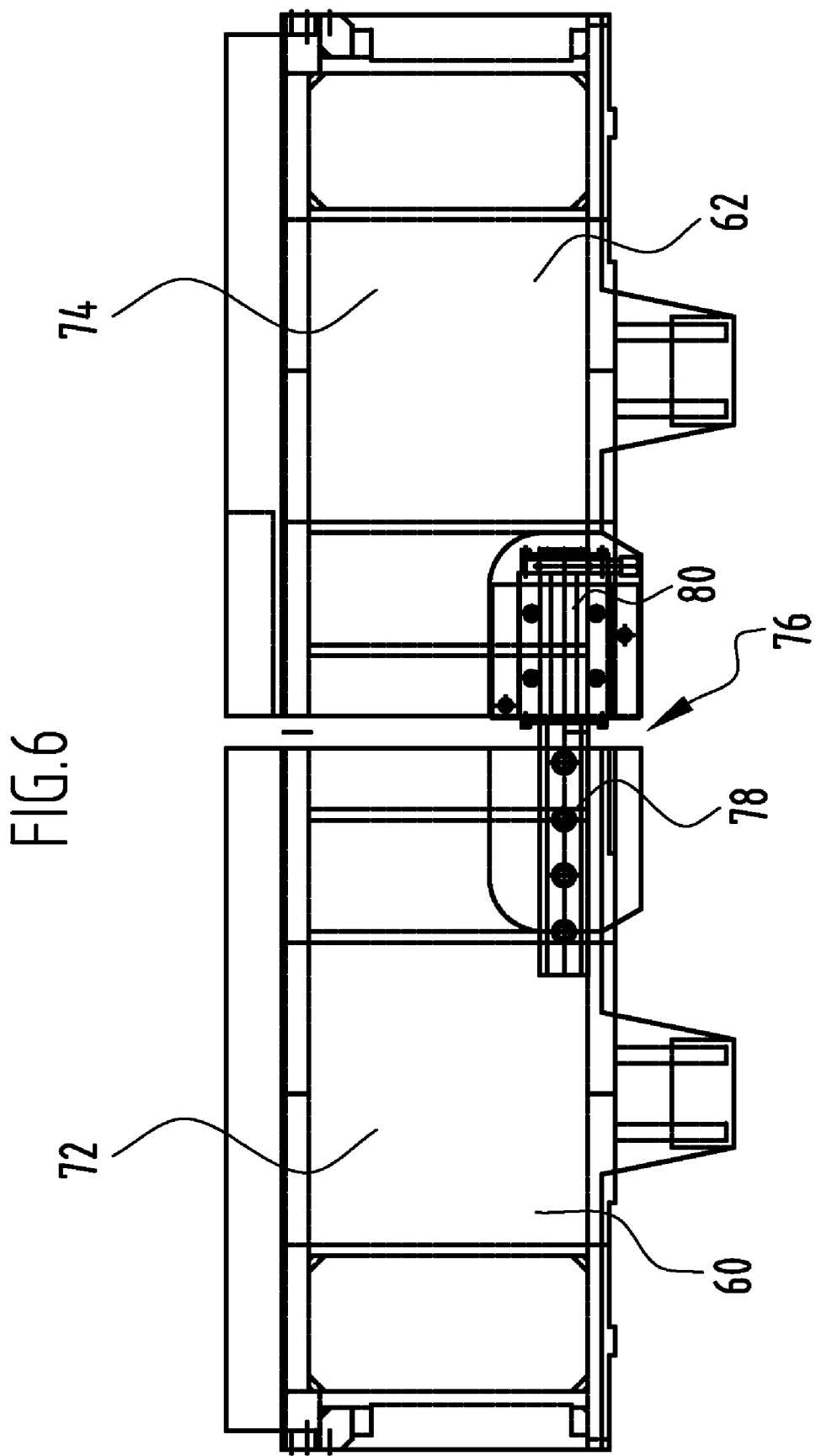
FIG. 6 shows a partial sectional illustration along line 6-6 according to FIG. 2.

The relative position of the two subslides 72, 74 is adjustable in the direction X, wherein the relative position is adjustable, for example, via a clamping device 76 (FIG. 6). As a result, a subslide assembly is formed which is movable as a whole, wherein, however, an adjustability of the relative position of the two subslides 72, 74 in the second slide 58 is made possible in the direction X.

Adapted connecting elements 78, 80 are provided for connecting the two subslides 72, 74 and these can be fixed to one another via the clamping device 76 in order to form the subslide assembly. For example, the subslide 72 has a bar-like element as connecting element 78 which dips into an adapted recess 80 as connecting element of the second subslide 74. The two subslides 72, 74 may be affixed to one another via the clamping of these two connecting elements 78, 80.

Two pairs of oppositely located motors 82, 84 and 86, 88 are provided for driving the second slide 58. The motors 82, 84 are arranged above the first guide path 64. The motors 86, 88 are arranged beneath the second guide path 66. The arrangement is preferably symmetric. The motors 82, 84, 86, 88 are, for example, linear motors. The oppositely located motors 82, 86 form a pair of linear motors. In the same way, the oppositely located motors 84, 88 form a pair of linear motors.

The displacement of the second slide 58 in the X direction is controlled. The X axis forms an NC axis. The second slide 58 is, in this respect, moved as a whole, i.e., as a subslide assembly.

A third slide 90 (Y slide) is guided on the second slide 58. This third slide 90 supports tool spindles. In the embodiment shown, the third slide 90 supports two tool spindles (twin spindle slide). A first tool spindle (a tool spindle receiving means 92 is shown in FIG. 2) passes through the first central opening 60 and is displaceable in it in the direction Y. A second tool spindle (a corresponding tool spindle receiving means 94 is shown in FIG. 2) passes through the second central opening 60 and is, again, movable in this in the Y direction. The two tool spindles are moved and positioned in the Y direction together with the third slide 90. The third slide comprises a first subslide 96 and a second subslide 98. The relative position of the two subslides 96, 98 is adjustable in the Y direction in a securable manner.

Spaced guide paths 100, 102 are arranged on the second slide (X slide) around the first central opening 60 and spaced guide paths 104, 106 are arranged around the second central opening 62. The third slide 90 is held and guided on these guide paths. In a central area of the third slide 90, this is separated into the first subslide 96 and the second subslide 98, wherein the first subslide is supported on the guide path 102 and the second subslide is supported on the guide path 104. When the connection between the subslides is released, the relative position of the two subslides 96, 98 may be adjusted in the direction Y. A typical order of magnitude for the adjustability is, in this respect, in the millimeter range. In order to affix the two subslides 96, 98 to one another and, in particular, in order to form a subslide assembly for forming the third slide 90, a clamping device is, for example, provided which connects corresponding connecting elements of the two subslides 96, 98 to one another. The two subslides 96, 98 are movable relative to one another in the X-Y plane and so an adjustment of the relative position of the subslides 72, 74 in the X direction is also made possible.

In order to move the third slide 90, oppositely located motors 108, 110 are provided. These are arranged, in particular, symmetrically in relation to the slide 90. The motors are, in particular, linear motors; the motors 108, 110 then form a pair of linear motors in a symmetric arrangement. The movement of the third slide (Y slide) 90 in the Y direction is brought about in a controlled manner. The Y axis for the movement of the third slide 90 forms a single NC axis. The Y axis is at right angles to the X axis and to the Z axis. The Y axis is, in particular, a vertical axis.

In accordance with the invention, at least one slide is separated into a plurality of subslides. In the embodiment described, all three slides 20, 58 and 90 are separated into respective subslides. The machine tool has a number of NC axes available in accordance with the number of slides or slide movement possibilities. In the case of the embodiment described, three NC axes are provided. As a result of the division of the at least one slide into subslides, a securable adjustment of the relative position between the subslides is possible. As a result, a correction of tool lengths can, for example, be carried out:

It is, in principle, possible for a tool held on the first tool spindle to be somewhat longer than a tool held on the second tool spindle. The reason for this can be varying wear and tear. This difference in lengths may be corrected in that the two subslides 26, 28 are displaced in the Z direction in accordance with the difference in the tool lengths and the position reached is then fixed. During the machining of the workpieces, the difference in tool lengths is automatically taken into consideration. The same also applies, in principle, for the adjustment of the relative position of the subslides for the second slide 58 and the third slide 90.

The lift of subslides relative to one another is in the order of magnitude of millimeters. For example, a lifting range for the relative position of the subslides 72, 74 in the X direction is in the range of 0.2 mm and of the subslides 96, 98 in the Y direction is the range of 0.2 mm. The range for the lifting movement of the slides 58, 90 is very much greater. For example, this is in the range of approximately 700 mm.

The assembly is also simplified as a result of a division of a slide into subslides, wherein the subslides can be adjusted in a securable manner in their relative position. The alignment of tool spindles relative to workpiece supports is, in particular, simplified.

In addition, a correction can also be carried out on the machine tool after the assembly. An exact correction may be achieved as a result of relative displacement of subslides in one slide.

The subslides in one slide have, in principle, separate axes of movement. As a result of the fixing of the subslides, the axes of movement are, however, "locked", i.e., a single axis of movement results for the subslide assembly and, therefore, a single (synchronized) NC axis. Also, a single NC program for the control of the movement is then necessary.

During the machining of workpieces, the subslides are fixed to one another to form one slide. The displacement of the subslides in one slide is brought about only during the assembly or correction of the machine tool according to the invention.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A machine tool, comprising:
at least one movable slide having a plurality of holders for at least one of tools and workpieces;
wherein the at least one slide comprises a plurality of separate subslides;
wherein the relative position of the subslides in relation to one another is adjustable in a securable manner; and
a securing device, adjacent subslides being fixable to one another via the securing device;
wherein a first subslide has first connecting elements and an adjacent second subslide has second connecting elements adapted for connection with the first connecting elements, said connecting elements being fixable to one another; and
wherein, during workpiece machining, the slide as a whole is driven as a subslide assembly with the first subslide and the second subslide fixed relative to one another.

2. The machine tool as defined in claim 1, wherein at least one holder is arranged on each subslide.

3. The machine tool as defined in claim 1, wherein exactly one holder is arranged per subslide.

4. The machine tool as defined in claim 1, wherein the relative position of adjacent subslides is adjustable.

5. The machine tool as defined in claim 1, wherein the relative position of the subslides is adjustable in a direction essentially parallel to the direction of movement of the slide.

6. The machine tool as defined in claim 1, wherein the at least one slide is guided on guide paths.

7. The machine tool as defined in claim 6, further comprising spaced, outer guide paths adapted for guiding the slide.

8. The machine tool as defined in claim 7, wherein at least one additional guide path is provided in order to support the at least one slide at, or in the vicinity of, a connecting area between subslides.

9. The machine tool as defined in claim 1, wherein a drive for the at least one slide is provided.

10. The machine tool as defined in claim 1, wherein the at least one slide supports a plurality of tool spindles.

11. The machine tool as defined in claim 1, wherein the at least one slide has a plurality of workpiece supports.

12. The machine tool as defined in claim 1, wherein a plurality of slides is provided, wherein the slides are movable in different directions.

13. The machine tool as defined in claim 12, wherein a first slide is provided, said slide being movable in a first direction.

14. The machine tool as defined in claim 13, wherein two spaced motors are provided for driving the first slide.

15. The machine tool as defined in claim 13, wherein a second slide is provided, said slide being movable in a second direction.

16. The machine tool as defined in claim 15, wherein two pairs of motors are provided for driving the second slide.

17. The machine tool as defined in claim 15, wherein a third slide is provided, said slide being movable in a third direction.

18. The machine tool as defined in claim 17, wherein two spaced motors are provided for driving the third slide.

19. The machine tool as defined in claim 17, wherein the third slide is supported by the second slide.

20. The machine tool as defined in claim 12, wherein a first slide supports a second slide and the second slide supports a third slide.

21. The machine tool as defined in claim 20, wherein at least one tool and/or workpiece is movable in all three spatial directions by means of a slide assembly comprising the first slide, the second slide and the third slide.

22. The machine tool as defined in claim 12, wherein the slides are disconnected in all the axes of movement of the machine tool.

23. A method for the correction or compensation of different tool lengths in a machine tool, comprising:
providing a movable slide supporting at least one of a plurality of tools and workpieces and being formed by means of subslides affixable to one another; and
adjusting the relative position of the subslides in accordance with the length of the tool supported on or associated with a respective subslide;
fixing the subslides to one another; and
controlling the movement of the slide during workpiece machining as a single subslide assembly.

24. The method as defined in claim 23, wherein the relative position of the subslides in the direction of movement of the slide is adjusted.

25. The method as defined in claim 23, wherein the subslides support different tools and/or workpieces to be machined by different tools.

* * * * *

UNITED STATES PATENT AND TRADEMARK OFFICE
CERTIFICATE OF CORRECTION

PATENT NO. : 7,331,099 B2  Page 1 of 1
APPLICATION NO. : 11/464059
DATED : February 19, 2008
INVENTOR(S) : Horn et al.

It is certified that error appears in the above-identified patent and that said Letters Patent is hereby corrected as shown below:

Title Page Of Patent:

Item (30) Foreign Application Priority Data should read

--Feb. 13, 2004 (DE).............. 10 2004 008 457.2--

Signed and Sealed this

Fourth Day of November, 2008

JON W. DUDAS
*Director of the United States Patent and Trademark Office*